Figure 1:
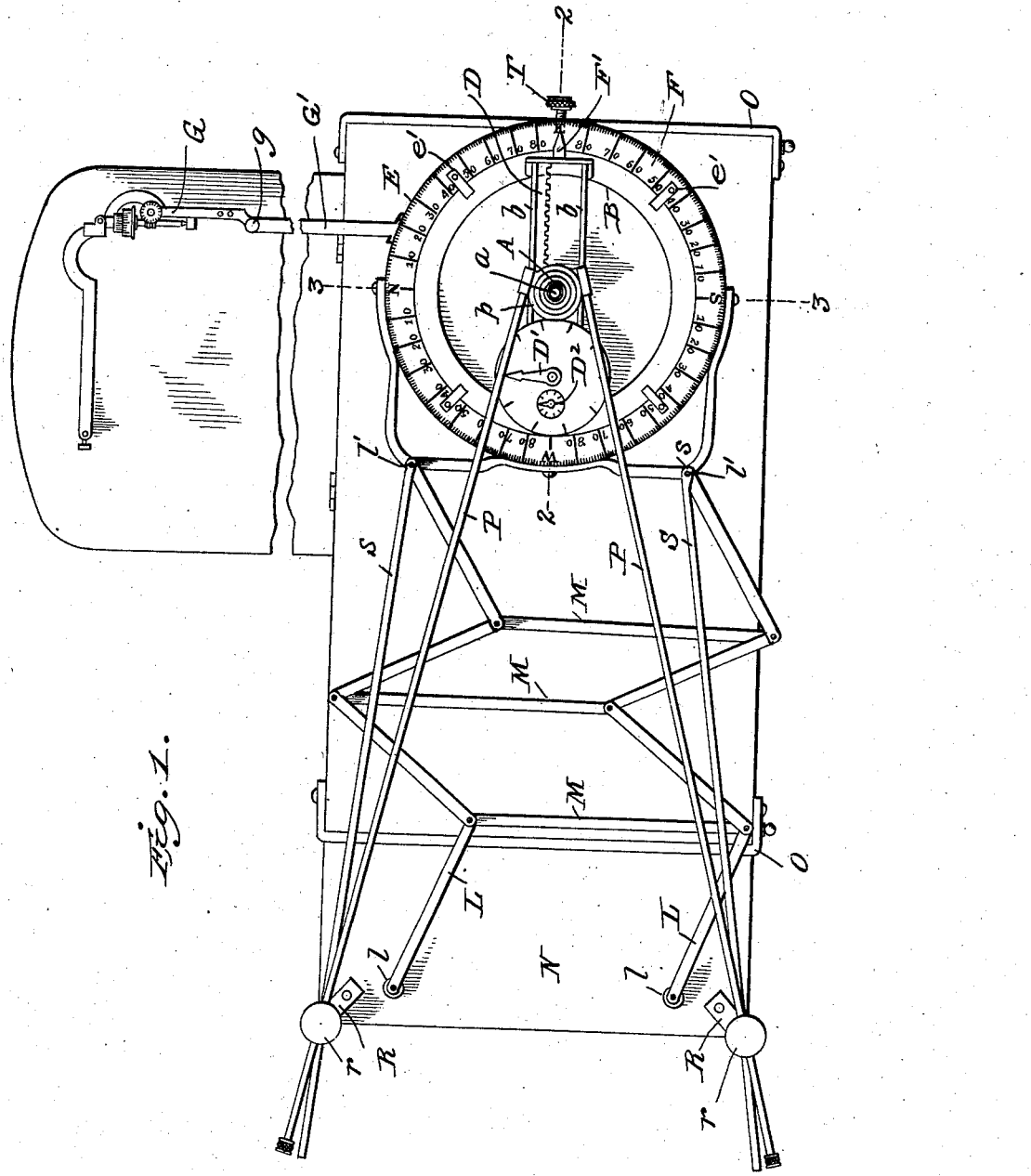

No. 845,753. PATENTED MAR. 5, 1907.
E. L. CAMPBELL.
PLOTTING INSTRUMENT.
APPLICATION FILED AUG. 13, 1906.

3 SHEETS—SHEET 1.

Witnesses
Edwin L. Jewell
Thomas Durant

Inventor
Edward L. Campbell,
By
His Attorneys

No. 845,753. PATENTED MAR. 5, 1907.
E. L. CAMPBELL.
PLOTTING INSTRUMENT.
APPLICATION FILED AUG. 13, 1906.
3 SHEETS—SHEET 2.
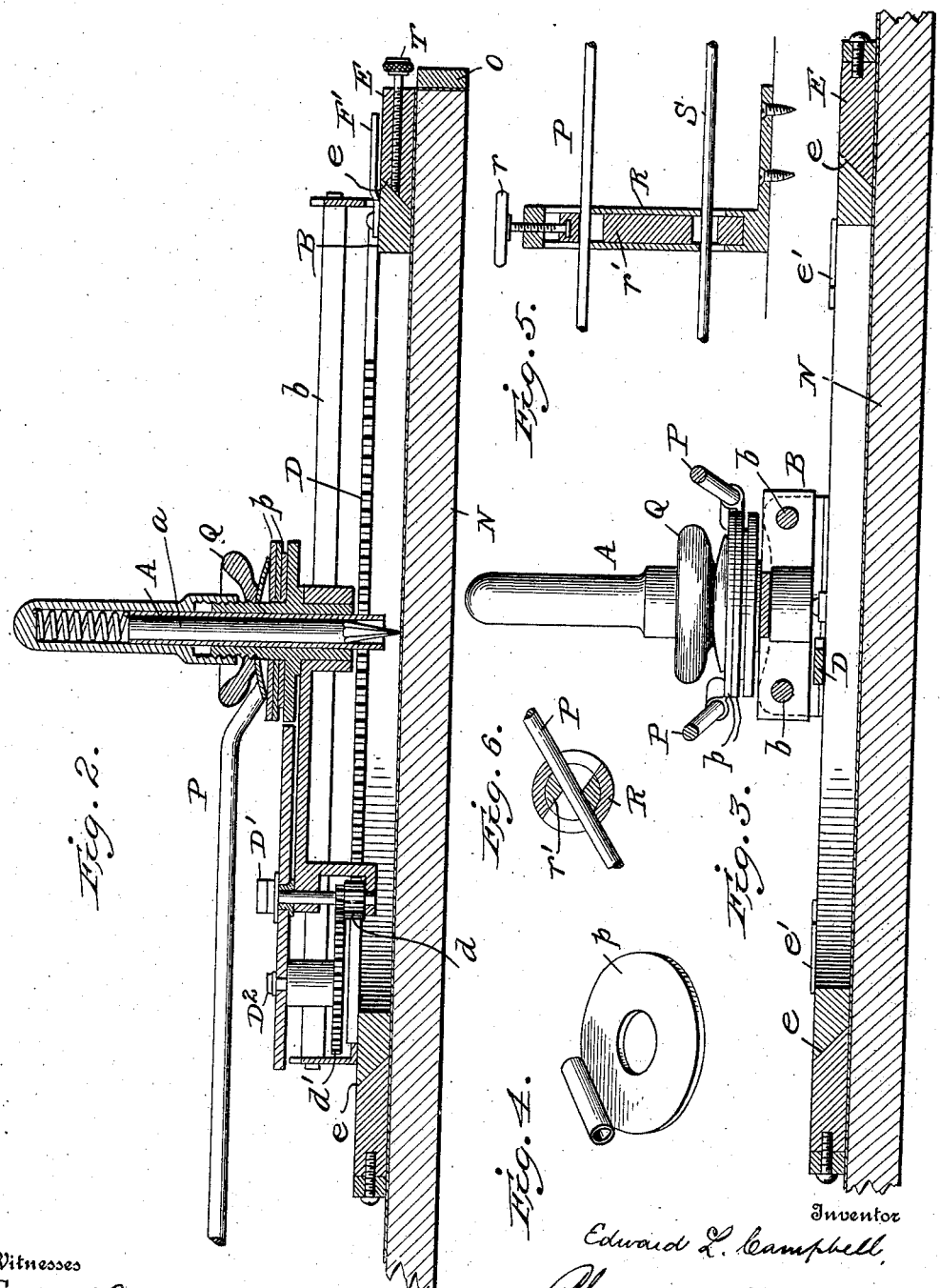
Witnesses
Edwin L. Jewell
Thomas Durant
Inventor
Edward L. Campbell,
By
his Attorneys No. 845,753. PATENTED MAR. 5, 1907.
E. L. CAMPBELL.
PLOTTING INSTRUMENT.
APPLICATION FILED AUG. 13, 1906.

3 SHEETS—SHEET 3.

Witnesses
Edwin L. Jewell
Thomas Durant

Inventor
Edward L. Campbell
By
his Attorneys

UNITED STATES PATENT OFFICE.

EDWARD L. CAMPBELL, OF KINGS MOUNTAIN, NORTH CAROLINA.

PLOTTING INSTRUMENT.

No. 845,753.  Specification of Letters Patent.  Patented March 5, 1907.

Application filed August 13, 1906. Serial No. 330,458.

*To all whom it may concern:*

Be it known that I, EDWARD L. CAMPBELL, a citizen of the United States, residing at Kings Mountain, county of Cleveland, State of North Carolina, have invented certain new and useful Improvements in Plotting Instruments; and I do hereby declare the following to be a full, clear, and exact description of the same, reference being had to the accompanying drawings, forming a part of this specification, and to the figures and letters of reference marked thereon.

This invention relates to instruments designed to facilitate the plotting, on a reduced scale, of surveyed areas or areas the metes and bounds of which are known from surveyors' notes or from other suitable data.

The object of the invention is to provide an instrument which, while of great advantage to those skilled in surveying and mathematics, shall also be capable of use by persons having relatively little knowledge of surveying and mathematics and whereby plots may be made and areas determined rapidly and with certainty from the surveyors' field notes or the description by metes and bounds to be found in deeds and other title documents without requiring triangulation and the calculation of the areas of offsets and insets.

The invention consists, primarily, in a plotting instrument embodying a carrying-frame movable to any position over the plotting field without changing its angular position thereon, a guide-frame angularly adjustable in said first-mentioned frame and having a style or scribe carrier movable in a right line, usually radially from the axis of the guide-frame, said scribe-carrier being adapted to itself form a guide for the two frames, whereby the carrying-frame may be made to follow accurately the movements of the style or scribe.

The invention further consists in an angularly-adjustable guide-frame and scribe-carrier movable in a right line with respect to each other, each adapted when held in fixed position to guide the other in its right-line movement, and a graduated segmental scale for determining the angular adjustment of the frame and carrier.

The invention further consists in certain novel details of construction and combinations and arrangements of parts, all as will be now described, and pointed out particularly in the appended claims.

Figure 7:
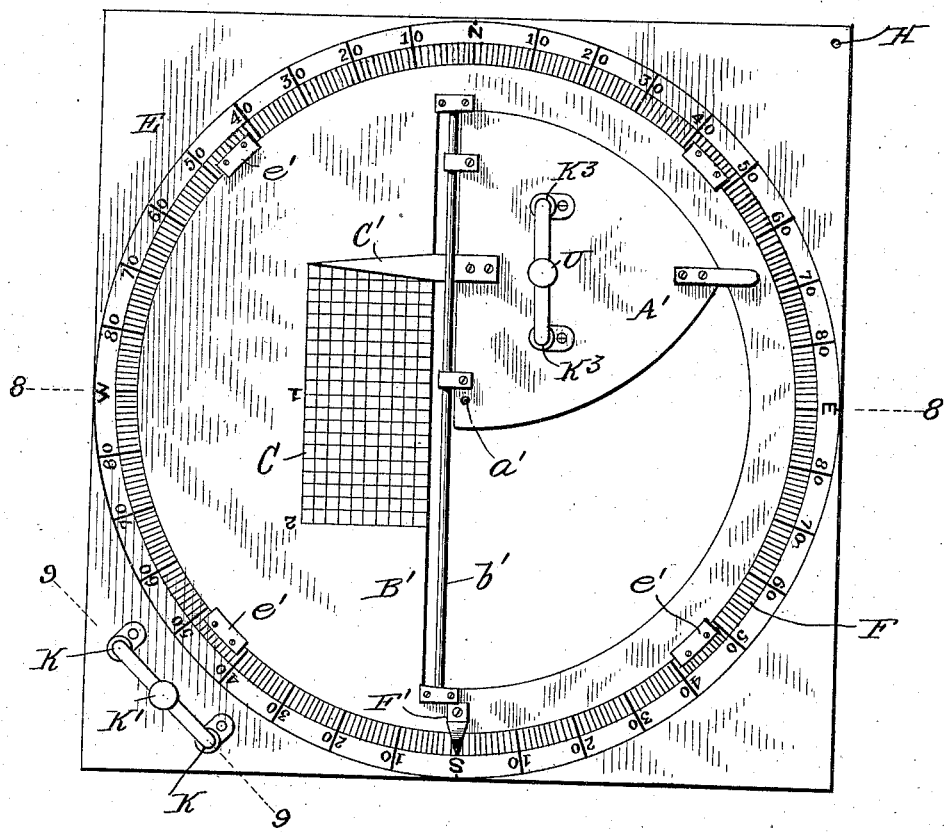
Figure 8:
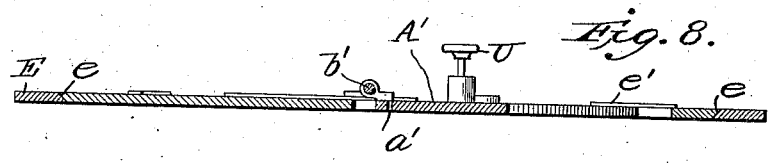
Figure 9:
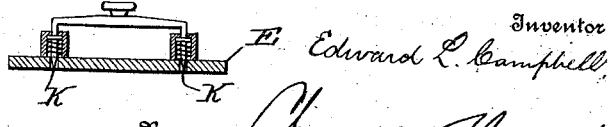

In the accompanying drawings, Figure 1 is a plan view of a plotting apparatus embodying the present invention. Fig. 2 is a vertical section on the line 2 2 of Fig. 1. Fig. 3 is a sectional elevation on the line 3 3, Fig. 1. Fig. 4 is a detail perspective of a part of one of the locking devices. Fig. 5 is a vertical and Fig. 6 a horizontal section of parts of the locking devices. Fig. 7 is a plan view of a simple form of instrument embodying the invention with the planimeter-drafting board omitted. Fig. 8 is a vertical section of the same on the line 8 8. Fig. 9 is a detail section on the line 9 9, Fig. 7.

Like letters of reference in the several figures indicate the same parts.

The forms of apparatus adopted for illustrating the present invention are only two of the many possible forms which will at once occur to those skilled in the art when the invention is understood, and hence while the forms adopted for illustration are preferred I do not wish to be limited thereto save where specific features of construction are claimed.

In carrying the invention into practice I employ a style or scribe carrier which, as shown at A in Figs. 1, 2, and 3, may actually carry a pencil $a$, or, as shown at A' in Figs. 7 and 8, may have an aperture $a'$ therein for the end of a pencil or style, which latter may be held in the hand and used not only to trace the lines of the plat, but also to move the carrier itself. The style or scribe carrier is mounted in or on ways in a guide-frame B, Figs. 1, 2, and 3, and B', Figs. 7 and 8, to move in a straight or right line with respect to said frame or to itself form a guide for permitting a similar movement of said frame with respect to the carrier. In the preferred construction the guide-frame is provided with a rigid way or rod $b'$, Figs. 7 and 8, or a pair of such rods $b$, Figs. 1, 2, and 3, on which rods the style-carrier is adapted to slide. The said straight or right-line movement of the carrier corresponds in extent to the lineal measurement of the surveyed line or line being plotted, and to enable the length to be determined a graduated scale and pointer are provided for indicating the relative movement. The graduations of the scale are preferably made in units having a certain relation to surveyors' measurements—as, for instance, one inch may correspond to one chain and one-hundreth of an inch to one link. In Fig. 7 a two-inch graduated scale or chart is shown at C, each inch being divided into tenths, and a pointer C', registering with the graduations, has its forward edge inclined or arranged diagonally to indicate tenths of the smallest graduation in the well-known manner. Thus each inch may indicate ten chains, each graduation one chain, and the diagonal edge of the pointer will permit of readings in links. If the plot be on a very small scale, each graduation may indicate ten chains, and the diagonal edge of the pointer will permit of readings in any number of chains less than ten; but in such instance it would not be practicable to indicate links, as the graduation would be too small.

Obviously the relative movement of the carrier and guide may be multiplied in the indicator, and in Figs. 1, 2, and 3 the guide is provided with a rack-bar D, with which a pinion $d$, journaled in the carrier, meshes. A hand or pointer D' on the arbor of the pinion is adapted to register with the circular series of graduations, and a second hand or pointer $D^2$, connected with the pinion $d$ through a reducing-gear $d'$, will indicate the number of revolutions of the long hand or pointer. With this arrangement it is entirely practicable to have the large hand make a revolution for each inch of movement of the carrier, and thus each revolution may indicate one chain and the minor graduations may indicate links or multiples of links—as, for instance, ten links for each graduation. The smaller hand will indicate multiples of chains, as will be readily understood.

In the preferred construction the guide-frame is in the form of a circle having a large opening therein in which the carrier and style or scribe move, and said guide-frame is mounted to turn or move angularly in a carrying-frame E. To permit of such turning without binding and at the same time to preserve the true axial position of the guide-frame, the periphery of the latter and of the opening in the carrying-frame in which it fits are inclined, as shown at $e$ in Figs. 2, 3, and 8, and the two are held against separation by an overlying retainer or retainers $e'$.

By adjusting the angular position of the guide-frame in the carrying-frame it is obvious that the style-carrier may be made to move in a straight line in any direction, and such angular adjustment is made to correspond to the direction in which the line being plotted is to run. The adjustment is indicated by a graduated circle and pointer, the former preferably being located on the carrying-frame, as shown at F, and the latter on the guide-frame, as shown at F'. The circle is preferably graduated, similar to the circle of a surveyor's compass, whereby the guide-frame may be set with relation to the carrier-frame at any angle corresponding to the direction in which the surveyed line runs with relation to the points of the compass. The arrangement of the parts is such that the style or scribe when in normal position is at the axis or center about which the angular adjustment is made, and hence while such adjustment sets the parts for extending or drawing a line in a certain direction it does not change the position of the style.

In the use of the instrument the guide-frame is set and the style-carrier and style moved forward a distance on the scale indicating the length of the line in that direction. Then the style-carrier is held against movement and the guide-frame and carrier-frame are moved forward with the style-carrier as a guide until the parts again occupy the former or normal relative positions. After this the carrier-frame is held and the guide-frame is again adjusted angularly, corresponding to the direction in which the line being plotted shall run, when the procedure is repeated.

From the foregoing it is obvious that the corner-frame, while it does not change its angular position, follows the same lines of movement and describes the same figure as the style or scribe, and hence it becomes practicable to connect the tracing-arm of an ordinary polar planimeter with any part of the carrier-frame to indicate the area of the plotted figure.

In Fig. 1 the planimeter G is shown with its tracing-point $g$ pivotally connected with the end of an arm G' on the carrying-frame, and in Fig. 7 the tracing-point may be held in an aperture H in one corner of the carrying-frame; but it is obvious that it may be attached at any point where it will of necessity describe a figure of the same shape and dimensions as that described by the style or scribe.

For preserving the angular position of the carrying-frame or determining the angular adjustment of the guide-frame on the drawing-board many different means may be employed. Thus the user may press the carrying-frame firmly down during the angular adjustment of the guide-frame and style-carrier and also during the subsequent straight movement of the latter. The style-carrier may be pressed firmly down during the straight movement of the carrier and guide-frames, one or the other being held at all times during the plotting operation. In such use of the instrument which is contemplated by the form shown in Figs. 7 and 8 the carrier-frame may be initially set square on a drawing-board by a T-square or angle, and the preservation of the alinement may be tested at any time by the same means.

Various means other than as above described may be employed to prevent the carrying-frame from changing its angular position with relation to the drafting-board while permitting it to follow the meander line of the plot. Thus it may have locking or holding points K, Fig. 7, spaced apart and adapted to be pressed into the board by a finger-piece K' whenever the frame is to be held in fixed position, or it may be connected with the board by parallel-link connections. (Shown in Fig. 1.) In the latter arrangement a series of parallel links L are pivotally connected together and their parallelism preserved by connecting-bars M. The links at one end of the chain of links are pivotally connected at l with the board N, and the links at the other end of the chain of links are pivotally connected with the carrying-frame at l'. The link connections are sufficiently flexible to permit the carrying-frame to be lifted to admit the paper beneath it, and the paper is held flat in position by clips or retainers O of ordinary construction. In lieu of the parallel-link arrangement, or preferably supplemental thereto, means are provided for locking the carrying-frame and style or scribe carrier to the board when they are to be held in fixed position, and these locking mechanisms are preferably so made that when one part is locked the other is unlocked, whereby either part may be locked at will, leaving the other free; but both cannot be locked at the same time. As illustrated in Figs. 1 to 6, two pairs of rods are employed, one pair (lettered P) being jointed to the style or scribe carrier by having the disks p on their ends confined beneath a jam-nut Q, concentric with the style or scribe, and their opposite ends passed through apertures in widely-separated locking-posts R on the board N. By tightening the jam-nut Q the style-carrier and guide-frame will be locked against angular movement, and by rotating the locking-screws r in the posts R in one direction the slides r' will clamp the rods and prevent bodily movement of the style-carrier in any direction. The rods S of the second pair are jointed to the carrier-frame at s and pass through apertures in the lower parts of the locking-posts in position to be clamped by the slides r' when the screws are turned in a direction to release the rods P. When clamped, the rods S hold the carrying-frame against movement. When rods S are locked, the rods P are unlocked, and if the jam-nut Q be released the style-carrier and guide-frame may be adjusted angularly, or the style-carrier may be moved bodily on the guide-frame.

With this arrangement it is obvious that great accuracy may be secured even though the plot be drawn to a very small scale, the manipulation of the parts preferably being as follows: Having placed the paper in position on the board and selected a proper starting-point from which the style or scribe may be passed around the plot to the right, the style is placed at such point and the carrying-frame locked. The guide-frame and style-carrier are then set by the circular scale and pointer to correspond to the direction of the first line of the plot. To prevent angular displacement, the guide-frame may then be locked to the carrying-frame by a set-screw T. The style-carrier is then moved on the guide-frame a distance corresponding to the length of the first line, the style operating to trace such line on the paper. The set-screws r are then turned to release the rods S and carrier-frame and to lock the rods P and carrier-frame and guide-frame are moved with the style-carrier as a guide until the parts are in normal position with the style at the axis or center for the angular movement of the guide-frame. The rods S are then locked and the rods P and set-screws T released and the guide-frame set by moving it angularly in the carrying-frame to correspond to the direction of the second line of the plot. This line is traced as described and the operations repeated for each subsequent line. The planimeter connected with the carrying-frame will describe the same figure as that described by the style and will indicate the area of the field in the plot.

The manipulation of the form of instrument shown in Figs. 7 and 8 in so far as the tracing of the plot is concerned is similar to that of the instrument shown in Figs. 1 to 6; but either the carrying-frame or the style-carrier are adapted to be held by hand during the movement of the other. As an additional precaution against slipping the style-carrier may be provided with spaced holding-points K$^3$, adapted to be pressed into the board or paper by a finger-piece U, similar in construction to the finger-piece K' and points K on the carrying-frame. This form of instrument is especially designed for field use, and with it a surveyor may while in the field draw a plot of the area surveyed without waiting to work up his notes at home and may thus check up and catch possible errors of his chain men, for if the survey will not close he knows at once that an error has been made and being on the spot he is in position to immediately correct the error.

It will be seen that the instruments described embody a construction wherein the style-carrier and guide-frame each forms a guide for the bodily movements of the other, and the angular adjustment is always made with the style as a center, and as a result the angular adjustment for fixing the direction of the next succeeding line may be readily made by the use of a graduated circle and pointer, one or the other of which preserves its angular position during the meandering of the instrument.

Having thus described my invention, what I claim as new, and desire to secure by Letters Patent, is—

1. In an instrument for plotting from previously-determined surveyors' courses of the metes and bounds of the area to be plotted, the combination with the guide-frame and style-carrier connected by right-line guides for relative movement in a right line each adapted to be held in fixed position and forming a guide for the other and adjustable together angularly around a style held by the carrier, of a graduated circular scale and pointer for determining the angular adjustments and a style held by the carrier and movable therewith to form the plot-lines.

2. In a plotting instrument, the combination with the guide-frame and style-carrier connected together and held against relative angular movement by right-line guides, said style-carrier and frame each occupying a fixed position to form a right-line guide for the other and bodily adjustable in unison angularly around a center formed by a style held by the carrier, of a graduated circle and pointer associated with said frame and carrier for determining the angular adjustment, a planimeter connected with the guide-frame to be moved thereby in forming a plot for determining the area plotted and a style held by and movable with the carrier to form the plot.

3. In a plotting instrument the combination with a guide-frame and style-carrier having a fixed angular relation to each other and connected for relative but corresponding successive movements in a right line, each occupying a fixed position to form a right-line guide for the other and a style for forming the lines of the plot held by the carrier and normally forming a center about which the frame and carrier are together angularly adjustable, of a scale for indicating the extent of the right-line movement and a circular scale and pointer associated with said frame and carrier for determining the angular adjustment of the frame and carrier.

4. In a plotting instrument, the combination with a guide-frame and a style-carrier having a fixed angular relation to each other each movable, but occupying a fixed position to form a right-line guide for the other whereby they may successively make similar bodily movements corresponding to the lines of the plot, of a graduated scale and pointer for indicating the extent of such relative movement and a graduated circular scale and pointer associated with the instrument for determining the angular position of the guide-frame and style-carrier, whereby the direction of the line to be traced by the style may be preliminarily determined and made to accord with the direction of a previously-surveyed line.

5. In a plotting instrument the combination with the carrying-frame, the guide-frame angularly adjustable therein and a graduated scale and pointer for indicating the angular adjustment, of a style-carrier connected with the guide-frame by a right-line guide whereby they may have a relative movement in a right line to each travel in lines corresponding to the lines of the plot and means whereby each may be held in fixed position to serve as a guide for the other in its right-line movements.

6. In a plotting instrument the combination with the carrying-frame, the guide-frame angularly adjustable therein and a graduated scale and pointer for indicating the angular adjustment, of a style-carrier connected with the guide-frame by a right-line guide whereby they may have a relative movement in a right line, said style-carrier having an opening for the style located at the axis of the angular adjustment when the parts are in normal position and means whereby either the guide-frame or style-carrier may be held in fixed position to serve as a guide for the other in its right-line movements.

7. In a plotting instrument, the combination with the carrying-frame, means whereby it may be held against angular movement, a guide-frame angularly adjustable in said carrying-frame and a graduated scale and pointer for indicating the angular adjustment, of a style-carrier connected with the guide-frame and held against angular movement with relation thereto by a right-line guide and having a style-opening movable with the carrier radially from the axis of angular adjustment, means whereby it may be held to form a guide for the guide and carrying frames in their bodily right-line movements and a graduated scale and pointer for indicating the relative bodily movement of the parts.

8. In a plotting instrument, the combination with the carrying-frame, means whereby it may be held against angular movement, a guide-frame angularly adjustable in said carrying-frame and a graduated scale and pointer for indicating the angular adjustment, of a style-carrier connected with the guide-frame by a right-line guide and having a style-receiving opening at the axis of the said angular adjustment when the parts are in normal position, means whereby the style-carrier may be held to form a guide for the carrying and guide frames in their bodily right-line movements, and a graduated scale and pointer for indicating such bodily movements.

9. In a plotting instrument the combination of a movable carrying-frame having a circular opening therein, a circular guide-frame mounted and movable angularly in said opening, a circular graduated scale and pointer for indicating such angular movement, right-line-guiding means fixed on said guide-frame, a style-carrier guided thereby and having a style-receiving opening located at the axis of angular movement when the parts are in normal position and movable radially from said position when the style-carrier is moved on the guide-frame.

10. In a plotting instrument the combination of a carrying-frame means for holding the same against angular movement, a guide-frame angularly adjustable in said carrying-frame, means for indicating its angular adjustment, a style-carrier movable bodily in a right line in said guide-frame, a graduated scale and pointer for indicating its right-line movement and means for locking said style-carrier in fixed position with relation to the supporting-base, whereby when the style-carrier is free it may be moved in a right line on the guide-frame and when locked the carrying-frame together with the guide-frame may be moved in a right line on the style-carrier.

11. In a plotting instrument, the combination of a carrying-frame means for holding the same against angular movement, a guide-frame angularly adjustable in said carrying-frame, means for indicating its angular adjustment, a style-carrier movable bodily in a right line in said guide-frame, a graduated scale and pointer for indicating its right-line movement and means for locking said style-carrier in fixed position and for locking the guide-frame against angular adjustment, whereby the style-carrier may serve as a right-line guide for the carrying and guide frames.

12. In a plotting instrument the combination of a bodily-movable carrying-frame, means for restraining said frame against angular movement, a circular guide-frame mounted to move angularly in said carrying-frame, means to indicate the angular movement and a style-carrier mounted on and guided to move in a right line by said guide-frame and having a style-opening normally coincident with the axis of the guide-frame.

13. In a plotting instrument, the combination of a bodily-movable carrying-frame, means for restraining said frame against angular movement, a planimeter connected with the carrying-frame, a guide-frame mounted to move angularly in said carrying-frame, means to indicate the angular movement, a style-carrier mounted on and guided to move in a right line by said guide-frame and having a style-opening normally coincident with the axis of the guide-frame and a graduated scale and pointer for indicating the extent of such right-line movement.

14. In a plotting instrument the combination of a bodily-movable carrying-frame, means for restraining said frame against angular movement, a planimeter connected with the frame, a guide-frame mounted to move angularly in said carrying-frame, means to indicate the angular movement, a style-carrier mounted on and guided to move in a right line by the guide-frame, means to indicate the extent of right-line movement and means for locking the style-carrier whereby when locked it will form a right-line guide for the two frames.

15. In a plotting instrument, the combination of a bodily-movable carrying-frame, means for restraining said frame against angular movement, a planimeter connected with the frame, a guide-frame mounted to move angularly in said carrying-frame, a graduated scale to indicate the angular movement, a carrier having a style-opening normally at the axis of the angular movement and mounted on and guided to move in a right line by the guide-frame, means to indicate the extent of the right-line movement, and means for locking the style against movement whereby it will form a guide for the frames.

16. In a plotting instrument, the combination with a scribe-guide and means for determining the angle and extent of the movements of the scribe which forms the plot, of a planimeter connected to said instrument and guided thereby during the formation of a plot to trace a figure coextensive with the plotted figure, for determining the area of the formed plot at the time it is formed.

17. In a plotting instrument, the combination with a planimeter for determining area of a plot, of a frame with which said planimeter is connected, a scribe-guiding means angularly adjustable in said frame said scribe right-line-guiding means also forming a guiding means for the frame to which the planimeter is connected, whereby the frame may be caused to follow in succession the movements of the scribe in forming the plot for determining the area of the plot at the time it is formed.

18. In a plotting instrument the combination with the carrying-frame, an angularly-adjustable guide-frame thereon and a style-carrier movable bodily in a right line on the guide-frame, of locking means for the carrier-frame and style-carrier embodying devices whereby when either one is unlocked the other will be locked by a continued movement of the devices.

19. In a plotting instrument, the combination of the carrying-frame, parallel links for restraining it against angular movement, an angularly-adjustable guide-frame on the carrier-frame, and style-carrier movable bodily in a right line on the guide-frame and a locking means for holding the style-carrier during the angular adjustment of the guide-frame and bodily movement of both the carrying and guide frames.

EDWARD L. CAMPBELL.

Witnesses:
N. F. McMILLAN,
C. J. DILLING.